(12) United States Patent
Hedman et al.

(10) Patent No.: US 8,787,399 B2
(45) Date of Patent: *Jul. 22, 2014

(54) CONTROLLING PACKET FILTER INSTALLATION IN A USER EQUIPMENT

(75) Inventors: Peter Hedman, Helsingborg (SE); Belen Pancorbo Marcos, Madrid (ES); Hans Mattsson, Bollebygd (SE); Lars Gunnar Lövsén, Göteborg (SE); Reiner Ludwig, Hürtgenwald (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 447 days.

This patent is subject to a terminal disclaimer.

(21) Appl. No.: 12/950,391

(22) Filed: Nov. 19, 2010

(65) Prior Publication Data

US 2011/0122885 A1 May 26, 2011

Related U.S. Application Data

(60) Provisional application No. 61/262,947, filed on Nov. 20, 2009.

(51) Int. Cl.
*H04L 12/56* (2006.01)
*H04L 29/06* (2006.01)

(52) U.S. Cl.
CPC ............ *H04L 45/74* (2013.01); *H04L 65/1016* (2013.01); *H04L 65/1026* (2013.01)
USPC ........................................................ 370/412

(58) Field of Classification Search
USPC ................................. 370/331, 401
See application file for complete search history.

(56) References Cited

U.S. PATENT DOCUMENTS 7,948,990 B2 * 5/2011 Hurtta et al. ................ 370/395.2
2004/0109459 A1 * 6/2004 Madour et al. ................ 370/401

(Continued)

FOREIGN PATENT DOCUMENTS

WO    WO 2007/079773    *    7/2007
WO    WO2007/079773    *    7/2007 .................... 370/331

(Continued)

OTHER PUBLICATIONS

NPL Document, 3GPP generation Partnership Project; Technical Specification Group Core Network and Terminal; Policy and Charging control over Gx reference point (release 9) 3GPP TS 29.212 V9.0.0 (Sep. 2009) pp. 92.*

(Continued)

*Primary Examiner* — Dang Ton
*Assistant Examiner* — Mewale Ambaye

(57) ABSTRACT

A communication system includes a user equipment (UE) 10 and a gateway 26. The UE (10) sends data packets on one or more bearers (52, 54) to the gateway 26. One or more packet filters (62, 64) are installed in the UE (10) for associating the data packets with the bearers (52, 54). A decision is performed if installation of a new packet filter (62, 64) in the UE (10) is required to map the data packets of indicated data traffic to a particular bearer (52, 54). The result of the decision may then be indicated from a policy controller (30) to a gateway (26) and/or from the gateway (26) to the UE (10). Depending on the result of the decision, the gateway may initiate signaling of the new packet filter (62, 64) to the UE (10) and/or the UE (10) may install the new packet filter (62, 64).

24 Claims, 9 Drawing Sheets

(56) References Cited

U.S. PATENT DOCUMENTS

2008/0189769 A1* 8/2008 Casado et al. ............... 726/4
2010/0027509 A1* 2/2010 Velev et al. ............... 370/331

FOREIGN PATENT DOCUMENTS

WO    WO 2007/079773 A1    7/2007
WO    WO 2009/118038 A1    10/2009

OTHER PUBLICATIONS

3GPP 3$^{rd}$ Generation Partnership Project: Technical Specification Group Core Network and Terminals; Policy and Charging Control Over Gx Reference Point (Release 9), 3GPP TS 29.212 v9.0.0, Sep. 2009.

3GPP. 3$^{rd}$ Generation Partnership Project: Technical Specification Group Services and System Aspects; Policy and Charging Control Architecture (Release 9). 3GPP TS 23.203 v9.2.0 (Sep. 2009).

3GPP. 3$^{rd}$ Generation Partnership Project: Technical Specification Group Services and System Aspects; General Packet Radio Service (GPRS); Service Description; Stage 2 (Release 9) 3GPP TS 23.060 v9.2.0 (20009-09).

3GPP. 3$^{rd}$ Generation Partnership Project, Technical Specification Group Services and System Aspects; General Packet Radio Service (CPRS) Enhancements for Evolved Universal Terrestrial Radio Access Network (E-UTRAN) Access (Release 9). 3GPP TS 23.101 v9.2.0 (Sep. 2009).

3GPP. 3$^{rd}$ Generation Partnership Project Technical Specification Group Services and System Aspects; IP Multimedia Subsystem (IMS): Stage 2 (Release 9) 3GPP TS 23.228 v9.1.0 (Sep. 2009).

3GPP. 3$^{rd}$ Partnership Project: Technical Specification Group Core Netevork and Terminals; Mobile Radio Interface Layer 3 Specification: Core Network Protocols; Stage 3 (Release 9). 3GPP TS 24.008 v9.00 (Sep. 2009).

3GPP. 3$^{rd}$ Generation Partnership Project; Technical Specification Group Core Network and Terminals; Non-Access-Stratum (NAS) Protocol for Evolved Packet System (EPS); Stage 3 (Release 9) 3GPP TS 24.301 v9.0.0 (Sep. 2009).

3GPP, 3$^{rd}$ Generation Partnership Project; Technical Specification Group Core Network and Terminals. Policy and Charging Control over Gx Reference Point (Release 9). 3GPP TS 29.212 v9.0.0 (Sep. 2009).

3GPP. 3$^{rd}$ Generation Partnership Project Technical Specification Group Core Network and Terminals; IP Multimedia Call Control Protocol Base on Session Initiated Protocol (SIP) and Session Description Protocol (SDP); Stage 3 (Release 91. 3GPP TS 24.229 v9 1.0 (Sep. 2009).

* cited by examiner

CONTROLLING PACKET FILTER INSTALLATION IN A USER EQUIPMENT

This application claims the benefit of U.S. Provisional Application No. 61/262,947filed on Nov. 20, 2009, the disclosure of which is fully incorporated herein by reference.

TECHNICAL FIELD

The present invention relates to methods of controlling packet filter installation in a user equipment and to corresponding devices.

BACKGROUND

In Policy and Charging Control (PCC), e.g. as described in 3GPP technical specification (TS) 23.203 (3GPP: $3^{rd}$ Generation Partnership Project), the Application Function (AF) is an element offering applications that require dynamic policy and/or charging control of traffic plane resources. Policy control may comprise for example functionalities for:
  Binding, e.g. the generation of an association between a service data flow and the Internet Protocol Connectivity Access Network (IP CAN) bearer transporting that service data flow;
  Gating control, e.g. the blocking or allowing of packets, belonging to a service data flow, to pass through to a desired endpoint;
  Event reporting, e.g. the notification of and reaction to application events to trigger new behavior in the user plane or the reporting of events related to the resources in a gateway (GW), e.g. a Policy and Charging Enforcement Function (PCEF);
  Quality of Service (QoS) control, e.g. the authorization and enforcement of the maximum QoS that is authorized for a service data flow or an IP CAN bearer, or
  bearer establishment, e.g. for IP CANS that support network initiated procedures for IP CAN bearer establishment.

In general terms, a bearer is an information transmission path with defined parameters, e.g. capacity, delay and bit error rate, etc. An IP CAN bearer can thus be described as an IP transmission path of defined capacity, delay and bit error rate, etc. and an IP CAN session as the association between a user equipment (UE) represented by an Internet Protocol (IP) address or UE identity information and a packet data network (PDN) represented by a PDN ID, e.g. an Access Point Name (APN). An IP CAN session incorporates one or more IP CAN bearers. A service data flow is an aggregate set of packet flows that matches a service data flow template, i.e. the set of service data flow filters in a PCC rule, required for defining a service data flow.

In the case of the IP Multimedia Subsystem (IMS) in the core network, a function termed as Proxy-Call Session Control Function (P-CSCF) plays the role of AF at the Session Initiation Protocol (SIP) signaling plane. The PCEF is the entity that can provide service data flow detection, charging and policy enforcement over the user plane traffic. Within a General Packet Radio Service (GPRS) access network, the PCEF is located in a node termed as Gateway GPRS Support Node (GGSN) while within the Evolved Packet System (EPS) architecture the PCEF is located in the PDN GW. A policy controller termed as Policy and Charging Rules Function (PCRF) is placed between the application layer (e.g. NS) where service session characteristics are negotiated and the media plane where the actual service is being delivered.

FIG. 1 shows a simplified illustration of a PCC architecture. In the architecture of FIG. 1, the PCRF installs PCC rules at the PCEF that, when the bearer binding is allocated at the PCEF, associates the PCC Rules with the IP-CAN bearer that carries the service data flows. For GPRS and EPS access this triggers the PCEF to send traffic flow template (TFT) filters to the UE, which specifies the contents of the service data flows.

In precondition signaling, e.g. for IMS (as described e.g. in 3GPP TS 23.228 and TS 24.229), the UE sets the precondition attributes for Session Description Protocol (SDP) media and sets parameters to "mandatory" for media which require local resources when resources for the media are not available yet. A precondition is a set of constraints about the session, which are introduced during the session initiation. The recipient of the session generates an answer, but does not alert the user or otherwise proceed with session establishment until the preconditions are met. This can be known through a local event, e.g. a confirmation of a resource reservation, or through a new set of constraints sent by the caller.

The P-CSCF (or AF) interrogates with the PCRF to request the AF session to be authorized. The PCRF authorizes the AF session and pushes down PCC rules to the PCEF for the SDP media which require additional resources.

The PCEF enforces the policies and initiates resource reservation for media which require additional resources by IP CAN specific procedures.

For GPRS, the GGSN initiates appropriate Packet Data Protocol (PDP) context and EPS bearer procedures. For EPS, this is accomplished by the PDN GW.

The PDP context and EPS bearer procedures include packet filters corresponding to the SDP media allowing the UE to bind the resource reservation with the SDP media so the UE can then initiate an SDP update indicating that resources are now available for the SDP media which didn't have resources available before. If the UE would not get any packet filter update, then the UE would not know whether the network has allocated resources for the SDP media. For example, if there was a PDP context or EPS bearer activation or modification the UE would not know whether it was for the SDP media or for any other application running in the UE.

The set-up of a "QoS-Assured" session will not complete until required resources have been allocated to the session, in a QoS-Assured session, the QoS bearer for the media stream shall be successfully established according to the QoS preconditions defined at the session level before the UE may indicate a successful response to complete the session and alert the other end point. The principles for when a UE shall regard QoS preconditions to be met are:
  A minimum requirement to meet the QoS preconditions defined for a media stream in a certain direction, is that an appropriate IP CAN bearer is established at the local access for that direction,
  Segmented resource reservation is performed since the end points are responsible to make access network resource reservations via local mechanisms.
  The end points shall offer the resources they may want to support for the session and negotiate to an agreed set. Multiple negotiation steps may be needed in order to agree on a set of media for the session. The final agreed set is then updated between the end points.
  The action to take in case a UE fails to fulfil the preconditions, e.g. failure in establishment of a Resource Reservation Protocol (RSVP) session, depends on the reason for failure. If the reason is lack of resources in the network, e.g. an admission control function in the network rejects the request for resources, the LIE shall fail to complete the session. For other reasons, e.g. a lack of an RSVP host or proxy along the path, the action to take is a local decision within the UE. For example, the UE may choose to fail to complete the session or attempt to complete the session by no longer requiring some of the additional actions.

However, according to 3GPP TS 24.008 and 24.301 the number of packet filters that can be installed in a TFT of the UE is limited. More specifically, the amount of precedence values is limited for a PDN connection i.e. all bearers connected to the same default bearer. The precedence values specify the order in which packet filters are applied when forwarding data packets to bearers and can, therefore, not have the same value for different packet filters. According to 3GPP TS 24.008 the same precedence value for different filters will result in a syntactical error. If a large number of packet filters is installed it may increase the need to reassign new precedence values to the installed packet filters if a packet filter to be installed should receive a precedence value that is already taken by another packet filter, and there may be a need to increase the amount of possible precedence values. Accordingly, if the PCEF always forwards all packet filters of the PCC rules to the UE there might be a need to extend the allowed packet filters in a TFT. This would in turn require larger information elements and thus increase the signaling overhead. Further, forwarding all packet filters of the PCC rules to the UE, generates a high signaling load.

Accordingly, there is a need for techniques which allow for efficiently controlling installation of packet filters in the UE.

SUMMARY

According to an embodiment of the invention, a method is provided which can be used in a policy controller of a communication system. The communication system includes a user equipment and a gateway, and is configured to send data packets on at least one bearer from the user equipment to the gateway. The user equipment is configured to install at least one packet filter for associating the data packets with the at least one bearer. According to the method, an indication of data traffic is detected. A control rule for the indicated data traffic is determined. A decision is performed, if installation of a new packet filter in the user equipment is required to map the data packets of the indicated data traffic to the at least one bearer.

According to a further embodiment of the invention, a method is provided which can be used in a signaling controller of a communication system. The communication system includes a user equipment and a gateway, and is configured to send data packets on at least one bearer from the user equipment to the gateway. The user equipment is configured to install at least one packet filter for associating the data packets with the at least one bearer. According to the method, a result of a decision if installation of a new packet filter is required in the user equipment to map indicated data traffic to the at least one bearer is obtained. The result is evaluated. In accordance with the evaluation, signaling of the new packet filter to the user equipment is initiated.

According to a further embodiment of the invention, a method is provided which can be used in a user equipment communicating with a gateway of a communication system. The communication system is configured to send data packets on at least one bearer from the user equipment to the gateway. The user equipment is configured to install at least one packet filter for associating the data packets with the at least one bearer. According to the method, a new packet filter is received in the user equipment. From signaling used to transmit the new filter, it is determined if installation of the new packet filter in the user equipment is required to map the data packets of indicated data traffic to the at least one bearer. The new packet filter is installed in accordance with the determination.

According to a further embodiment of the invention, a policy controller is provided. The policy controller is configured to be used in a communication system with a user equipment and a gateway. The communication system is configured to send data packets on at least one bearer from the user equipment to the gateway. The user equipment is configured to install at least one packet filter for associating the data packets with the at least one bearer. The policy controller includes an interface configured to receive an indication of data traffic. Further, the policy controller is provided with a processor configured to determine a control rule for the indicated data traffic. In addition, the processor is configured to perform a decision if installation of a new packet filter is required to map the data packets of the indicated data traffic to the at least one bearer.

According to a further embodiment of the invention, a signaling controller is provided. The signaling controller is configured to be used in a communication system with a user equipment and a gateway. The communication system is configured to send data packets on at least one bearer from the user equipment to the gateway. The user equipment is configured to install at least one packet filter for associating the data packets with the at least one bearer. The signaling controller includes an interface far receiving a result of a decision if installation of a new packet filter is required in the user equipment to map data traffic to the at least one bearer. In addition, the signaling controller is provided with a processor configured for evaluation of the result and initiating signaling of the new packet filter to the user equipment in accordance with the evaluation.

According to a further embodiment of the invention, a user equipment is provided. The user equipment includes a transmitter configured to send data packets on at least one bearer to a gateway. Further, the user equipment is provided with a processor configured to install at least one packet filter for associating the data packets with the at least one bearer. The user equipment also includes a receiver configured to receive a new packet filter. In addition, the user equipment is provided with a detector. The detector is configured to determine, from signaling used to transmit the new packet filter, if installation of the new packet filter is required to map data packets of indicated data traffic to the at least one bearer. The processor is further configured to install the new packet filter in accordance with the determination by the detector.

According to further embodiments, other methods, network components, or computer program products may be provided.

DETAILED DESCRIPTION OF EMBODIMENTS

Figure 1:
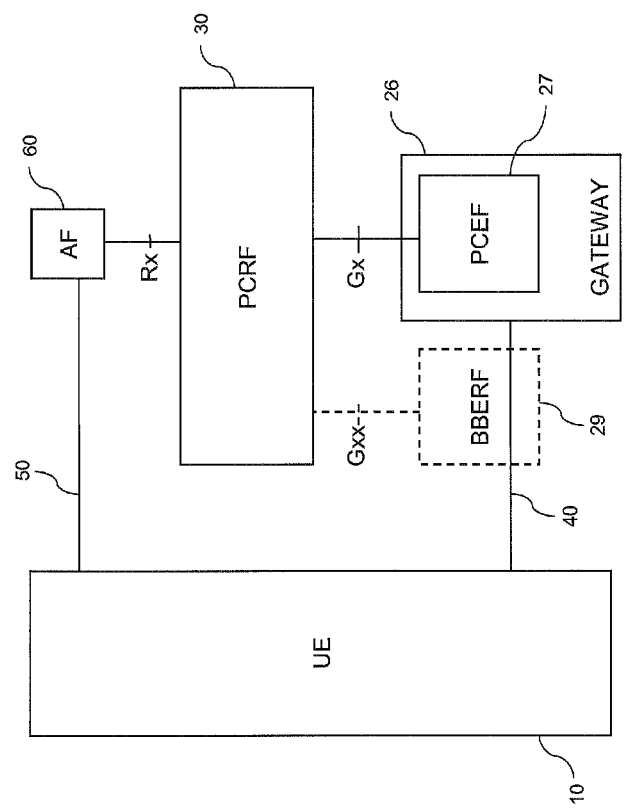
FIG. 1 schematically illustrates a policy and charging control architecture.

In the following, the invention will be explained in more detail by referring to exemplary embodiments and to the accompanying drawings. The illustrated embodiments relate to concepts of controlling the installation of packet filters in a UE. In the illustrated examples, the concepts are applied in a mobile communication network according to the 3GPP Technical Specifications. However, it is to be understood that the illustrated concepts may be applied in other types of communication network as well.

In mobile communication networks it is known to direct network traffic related to a specific service to a bearer with a certain QoS. In this respect, a bearer is considered to be an information transmission context or path of defined characteristics, e.g. capacity, delay and/or bit error rate. Typically, a number of bearers will be established between a gateway of a mobile communication network and a UE, e.g. a mobile phone or other type of mobile terminal. A bearer may carry downlink (DL) data traffic in a direction from the network to the UE, and may carry data traffic in an uplink (UL) direction from the UE to the network. In the gateway and in the user equipment the data traffic, which includes a plurality of IP data packets can be filtered, e.g. using IP 5 tuple packet filters, thereby directing the IP data packets to a desired bearer. The packet filters form a TFT of the bearer.

Specifically, it is desired to direct data traffic relating to a specific service, e.g. mobile TV, to a bearer offering a certain QoS. For this purpose, DL data traffic may be subjected to a packet inspection so as to identify data packets relating to a specific service. When data packets of a predefined service are detected, this may be signaled to a policy controller. The policy controller may then generate corresponding packet filters and signal these packet filters to the gateway. The gateway then uses the received packet filters to route the data packets to a desired bearer. The bearer typically has a QoS class which was chosen by the network operator for the specific service. In this process, there may also be signaling to the UE, e.g. for establishing the bearer and indicating UL packet filters to the user equipment, which should be used to route UL data traffic onto the bearer.

According to concepts as described herein, packet filters may be forwarded to the UE when the UE requires the packet filters or when the network is uncertain whether it is required, e.g. in case of an unknown service. As an alternative, the packet filters may be forwarded to the UE in such a way that they are installed in the UE only when required. Accordingly, a packet filter may be forwarded to the UE, but not installed in the TFT of the bearer.

In accordance with these concepts, a method according to an embodiment of the invention includes detecting an indication of data traffic. The data traffic may be without an associated control rule or may have an associated control rule which is to be modified. A new control rule for the indicated data traffic is then determined. A decision is performed if a filter installation is required to map the data packets of the indicated data traffic to the bearer. In an optional embodiment of the method, a flag is set in a message to the gateway, wherein the flag indicates the result of the decision. In a further optional embodiment which can be used alternatively to or together with the flag embodiment, a packet filter for the indicated data traffic is signaled to the user equipment and the signaling indicates if an installation of the signaled packet filter is required according to the decision. In this further embodiment, an indication if an installation of the signaled packet filer is required according to the decision can also be sent to the gateway, e.g. together with or replacing the flag.

The above indication of data traffic can for example be a description of a data flow received by a PCRF from an AF via the Rx interface. A control rule can for example be a PCC rule as described above or a QoS rule. Data traffic without an associated control rule can alternatively also be specified as data traffic without an associated PCC rule, as data traffic without an associated filter, or as data traffic without an associated QoS rule.

It should be noted that the decision if a filter installation is required does not mean a decision if a specific packet filter is determined or not. For example, a packet filter may be determined and signaled to the gateway even if it is not required for installation, for example in order to specify a portion of the media plane traffic by the packet filter parameters.

The concepts may be applied for all bearers of a user equipment or only for selected bearers, e.g. only for the default bearer.

According to an embodiment of the invention, a controller in the communication system may be configured to implement the above concepts. For example, a policy controller may comprise a receiver for receiving an indication of data traffic, e.g. data traffic without an associated control rule or data traffic with an associated control rule which is to be modified. The policy controller may further include a processor for determining a control rule for the indicated data traffic. The processor may be adapted to perform a decision if a filter installation is required to map the data packets of the indicated data traffic to the bearer.

The policy controller may also comprise a transmitter for sending the result of the decision to other entities. Optionally, the controller comprises a transmitter adapted to set a flag in a message to the gateway, wherein the flag indicates the result of the decision.

Further, a signaling controller of the communication system may comprises an interface for receiving a result of a decision if a filter installation is required to map the data packets of the indicated data traffic to the bearer, a processor for evaluating the result and to initiate signaling to the user equipment, and a transmitter for forwarding the packet filter or an indication if the packet filter is to be installed to the user equipment subject to the result.

For example, the signaling controller may be in a gateway. The signaling controller may be a PCEF or a BBERF. The signaling controller may be adapted to send an information indicating that it is adapted for evaluating the result and acting accordingly to the policy controller so that the policy controller can adjust the signaling to different gateways in the communication system. For example, the policy controller may, depending on the information, include in the signaling an indication if a sent filter shall be installed in the user equipment or not.

In an embodiment of the invention, the decision can be taken in an external entity, e.g. in the policy controller or PCRF. In this case the interface can be a receiver in the signaling controller for receiving messages from the policy controller. It is alternatively possible that the decision is performed in the signaling controller so that the interface connects different functions in the signaling controller. For example, a PCEF as signaling controller could check independently of a PCRF if a filter installation is required. A corresponding routine could e.g. access a memory associated with the signaling controller for determining filters installed already in the user equipment and checking if the installation of the filter under consideration would change the mapping of data packets to the bearers.

According to a further embodiment of the invention, the UE also be adapted to the above concepts. For this purpose, the UE may comprise a transmitter to send data packets on at least one bearer to the gateway, and a processor adapted to install at least one filter for associating the data packets with the at least one bearer. The UE may also comprise a detector to determine if a filter installation is required to map the data packets of the indicated data traffic to the bearer for a signaled packet filter. The processor may be adapted to perform the filter installation in response to the result determined by the detector. For example, the detector may be implemented as a software function in the processor which is adapted to analyze received signaling.

The invention relates also to a communication system adapted to the above concepts as well as to computer programs on a data carrier or loadable into a memory or processing system of a controller or gateway for executing aspects of the above method. The devices, systems and programs may be adapted to any embodiments described with respect to the method and the detailed embodiments. Embodiments of the proposed invention can also be used for downlink traffic wherein data packets are sent from the gateway to the user equipment if the gateway is adapted to install the filter.

Figure 2:
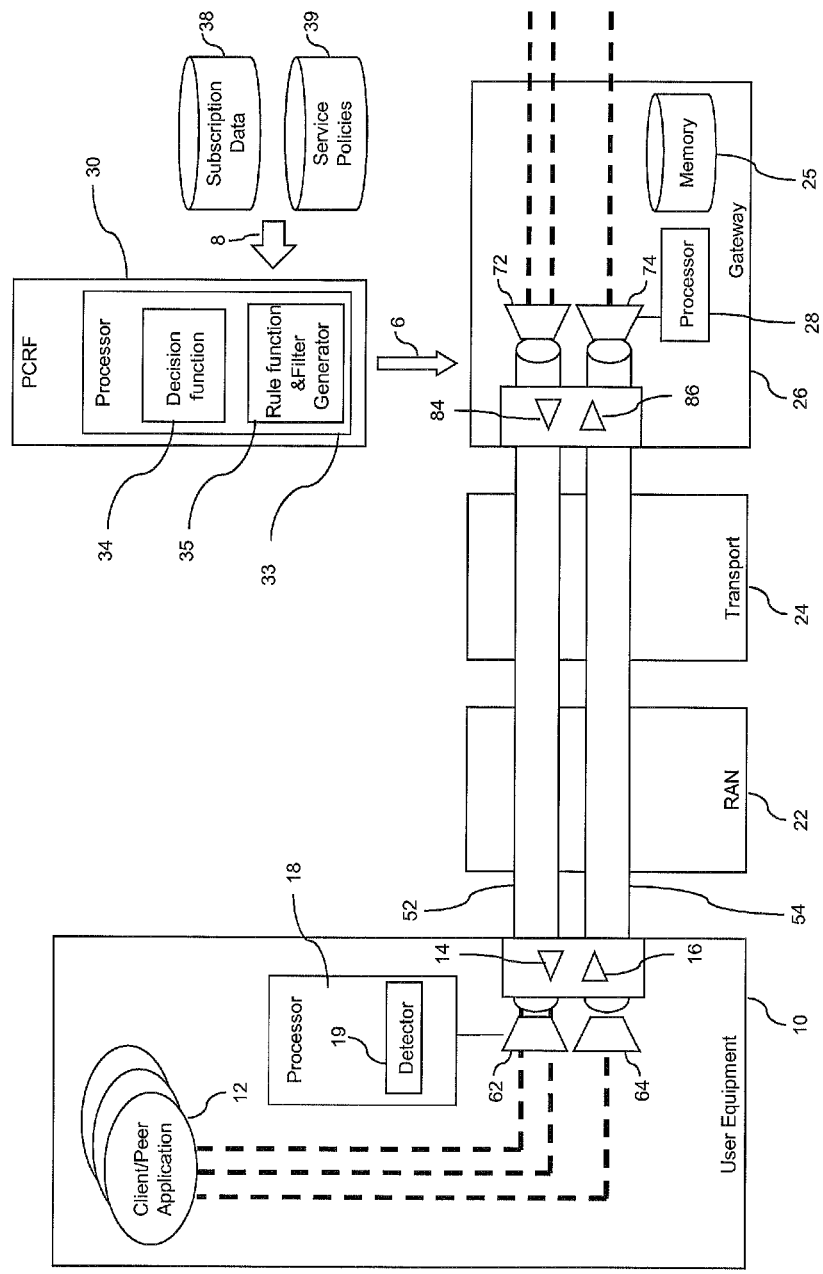
FIG. 2 schematically illustrates a communication system in which concepts according to embodiments of the invention are implemented.

FIG. 2 schematically illustrates a communication network environment in which concepts according to embodiments of the invention the invention can be applied.

The communication network environment includes a UE 10, which may also be referred to as a terminal, and a number of network components 22, 24, 26, 30. Among these network components there is a Radio Access Network (RAN) 22. The RAN is based on a certain type or certain types of radio access technology, e.g. GSM (Global System for Mobile Communications), EDGE (Enhanced Data Rate for GSM Evolution), UMTS (Universal Mobile Telecommunications System) or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a System Architecture Evolution Gateway (SAE GW) according to the 3GPP Technical Specifications. It may include a PCEF and a processor and memory for implementing the functions of the second controller as described.

In addition, the mobile communication network includes a policy controller 30, which is implemented as a Policy and Charging Rules Function (PCRF) according to the 3GPP Technical Specifications. The policy controller 30 may be implemented by dedicated hardware and/or comprise software functions executed by a processor 33. The gateway 26 and the policy controller 30 are typically regarded as components of a core network. The policy controller 30 communicates with the gateway 26 via a signaling path 6, which may be implemented using the Gx interface according to the 3GPP Technical Specifications.

The policy controller 30 may be further coupled to a subscription database 38 and to a service policy database 39 via a signaling path 8, e.g. implemented using a Sp interface according to the 3GPP Technical Specifications. The policy controller 30 may thus receive policy data relating to a specific user and/or relating to a specific service available in the mobile communication network, e.g. mobile TV. The policy controller 30 thus provides interfaces for supporting the signaling paths 6, 8. The controller 30 may comprise further interfaces, e.g. transmitters and receivers, e.g. for receiving information from an AF. A rule function and filter generator 35 is adapted to specify filters according determined control rules for data traffic and a decision function 34 is adapted to perform a decision if a filter installation is required to map the data packets of certain data traffic to a bearer.

As further illustrated, service-related data traffic between the network and the user equipment 10 is carried by a number of bearers 52, 54. The service-related data traffic typically pertains to one or more client/peer applications 12 running on the UE 10. The bearers 52, 54 are established between the user equipment 10 and the gateway 26. The bearers 52, 54 carry data traffic in both the DL and the UL direction, i.e. may also be regarded as being formed of a DL bearer and a UL bearer. For supporting bidirectional communication on the bearers 52, 54, the UE 10 is provided with a transceiver structure. i.e. both a receiver 14 for receiving incoming data packets from the bearers 52, 54 and a transmitter 16 for sending outgoing data packets an the bearers 52, 54. The bearers 52, 54 may include a default bearer generally established for offering packet-based services to the user equipment 10 and one or more dedicated bearer 54 which may have different QoS level, e.g. a higher QoS level, than the default bearer. Each bearer 52, 54 may be associated with a corresponding QoS profile. Parameters of the QoS profile may be a QoS class identifier (QCI), an allocation/retention priority (ARP), a maximum bit rate (MBR), and/or a guaranteed bit rate (GBR). Accordingly, each bearer 52, 54 may be associated with a corresponding QoS class. A processor 18 is adapted to install the filters and comprises a detector 19 to determine if filter installation is required.

In the UE 10, the data packets are routed to a desired bearer 52, 54 using correspondingly configured UL packet filters 62, 64. In the gateway 26, the data packets are routed to the desired bearers 52, 54 using correspondingly configured DL packet filters 72, 74. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 via the signaling path 6. As regards the UL packet filters 62, 64 used in the UE 10, these may be signaled from the policy controller 30 via the gateway 26.

Figure 3:
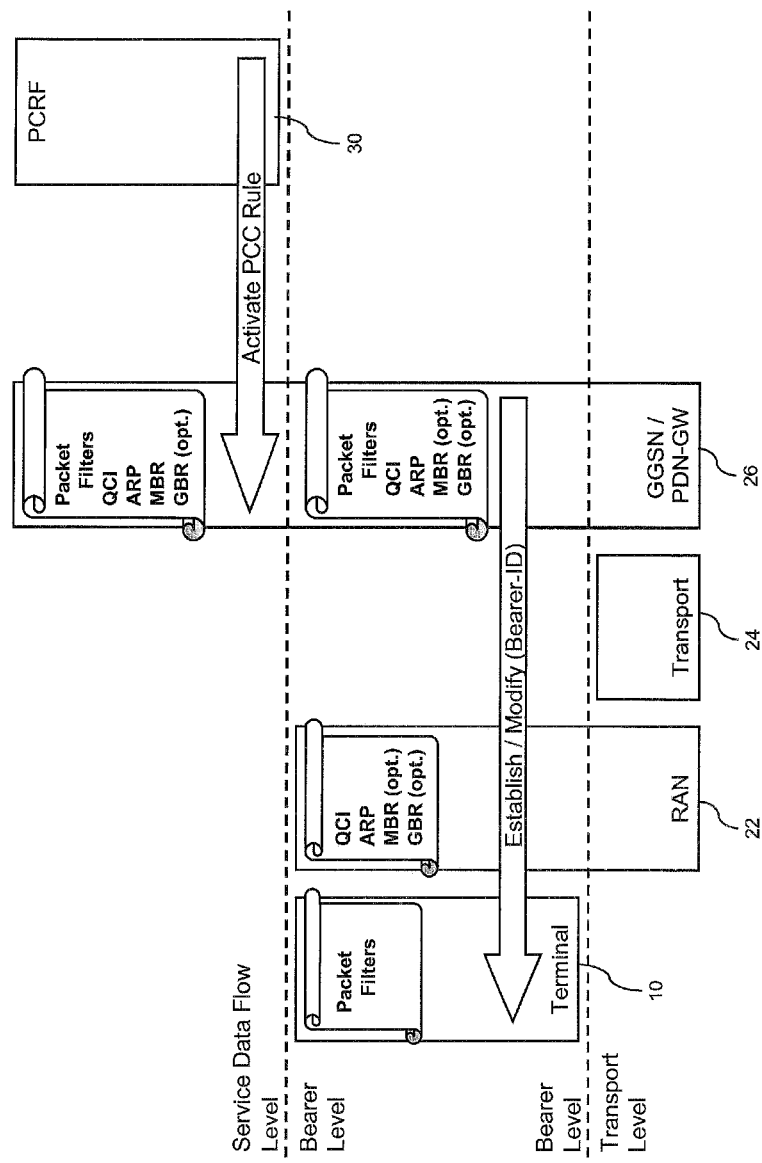
FIG. 3 illustrates an information flow in the communication system of FIG. 2.

FIG. 3 illustrates an information flow forwarded from the policy controller, i.e. PCRF, via intermediate nodes, i.e. the gateway 26, the transport node 24, and the RAN 22, to the UE 10 due to activation of a PCC rule in order to install packet filters in the UE 10. As illustrated, the PCRF 30 activates a PCC rule by sending corresponding information to the gateway 26. The information may include packet filters and QoS parameters, e.g. a QCI, ARP, MBR or GBR. The gateway 26 then performs the required signaling to the UE 10, which is also referred to as IP CAN signaling. This signaling has the purpose of establishing or modifying a certain bearer, e.g. as identified by a bearer identification (Bearer-ID). In this process, QoS parameters, e.g. QCI, ARP, MBR or GBR may be signaled to the RAN 22, and UL packet filters may be signaled to the UE 10.

According to an embodiment of the invention, the PCRF 30 provides an indication in the PCC rules, e.g. per PCC rule or per filter in the PCC rule, whether the PCEF should forward the filter information towards the UE 10 using IP CAN signaling. This may be accomplished by setting one or more flags in a message from the PCRF 30 to the PCEF. That is to say, the flag may be in the message or may be per PCC rule or per filter within the PCC rule. The PCRF 30 could make the setting of this flag or these flags dependent of whether precondition signaling is required by the UE 10. The PCRF 30 may obtain this information through the SDP signaled on Rx.

For GPRS and EPS, the PCEF, e.g. implemented in the gateway 26, initiates appropriate PDP context and EPS bearer procedures to activate a new bearer or modify an existing bearer including the packet filters the PCRF 30 indicated to be forwarded. The PCEF does not forward the packet filters the PCRF 30 indicated not to be forwarded. If no indication is present, the PCEF may forward the packet filters in a known manner. If no packet filters are to be forwarded, the PCEF only initiates IP CAN signaling if required for other parts of the PCC rules, e.g. due to QoS requirements. For those accesses in EPS that initiate EPS bearer procedures from the BBERF, the BBERF takes the decision to forward packet filters to the UE 10 based on the information received from the PCRF 30 over Gxx. This is accomplished in the same manner as described for the PCEF. Here, it is to be noted that the rules provided from the PCRF 30 to the BBERF are typically referred to as QoS rules, but may be handled in a similar manner as described above for the PCC rules. Accordingly, the PCEF and the BBERF may both be regarded as a signaling controller which enforces PCC rules or QoS generated by the PCRF 30 by performing corresponding signaling towards the UE 10. Additional characteristics of the BBERF can be found in 3GPP TS 23203. In this case bearer control is performed in a signaling gateway associated with the BBERF as indicated in broken lines of FIG. 1.

According to an embodiment of the invention, the Gx interface and/or the Gxx interface support an indication whether the Service Data Flow Filter shall be included in the packet filter to be sent to the UE 10 or not. The indication can be included within the Charging-Rule-Definition AVP (Attributed Value Pair) when PCC Rules are pushed over Gx or within the QoS-Rule-Definition AVP when QoS Rules are pushed over Gxx to the BBERF. According to some embodiments of the invention, the indication may have a value of e.g. "inform the UE" or "for information to UE only". The PCEF or BBERF may then select appropriate action towards the UE 10 as described below.

According to some embodiments of the invention, the capability to detect whether the packet filters should be forwarded to the UE 10 may be advertised by the PCEF to the PCRF 30 over Gx during Gx session establishment. Similarly, in some embodiments the capability to detect whether the packet filters should be forwarded to the UE 10 may be advertised by the BBERF to the PCRF 30 over Gxx during Gxx session establishment.

In such embodiments, if the PCRF 30 receives an indication that the signaling controller, the PCEF or the BBERF, supports this capability and a request to reserve resources for a session with preconditions is received over Rx, then the PCRF 30 includes the indication "inform the UE" or "for information to the UE only" within the PCC rule or QoS rule. If the PCRF 30 receives an indication that the PCEF or BBERF does not support this feature and a request to reserve resources for a session with preconditions is received over Rx then the PCRF 30 activates the PCC/QoS rules in the signaling controller without including the indication, i.e. installs PCC rules in the PCEF or installs QoS rules in the BBERF. This may in turn trigger a signaling of the corresponding packet filter(s) to the UE 10. If the signaling controller, i.e. the PCEF or the BBERF, is informed that the maximum number of TFT filters is reached then the PCRF 30 takes actions such as terminating the session over Rx or to map the media into the default bearer for those cases where the PCEF or BBERF does not place TFTs in the default bearer.

According to some embodiments of the invention, the signaling controller, i.e. the PCEF or the BBERF, could pass the packet filters to the UE 10 using a TFT operation which doesn't install the packet filter(s) to the TFT if there already is a packet filter on the bearer the network intends to add the new application traffic on, which would allow the new application traffic to be passed on that bearer. For example, such a bearer may be a non GBR bearer, e.g., default bearer, with wide packet filters that catch most or all traffic. In some cases, it is possible that the default bearer does not catch all traffic, e.g. if a specific kind of traffic shall not be allowed for the UE 10. One example of such a TFT operation which doesn't install the packet filter(s) is the 'No TFT operation' (see 3GPP TS 24.008), which currently is used to associate a bearer change to the packet filters of a bearer. According to 3GPP TS 24.008, the TFT operation "No TFT operation" shall be used if a parameters list is included but no packet filter list is included in the TFT information element. According to some embodiments of the invention, the "No TFT operation" is modified to allow the "No TFT operation" to be used together with packet filter information. For example, the "No TFT operation" may be used when the policy controller sets the flag to "for Information to UE only". According to further embodiments of the invention, a new TFT operation which doesn't install the signaled packet filters may be defined. Such a new TFT operation could then be used also in the case when there is no TFT installed on the bearer or if there is a TFT installed on the bearer, e.g. with packet filters allowing the new application traffic to be passed on the bearer. According to further embodiments of the invention, an indication may be added in the signaling towards the UE, e.g. as part of a new information element.

If there is no TFT installed on the bearer then new packet filters might not only be for information to the UE 10, but also to be used to restrict the traffic on the bearer. If the new packet filters provided include a "match all" packet filter that would allow all traffic to be passed on the bearer then the PCEF or BBERF can assume that other packet filters don't need to be installed on the bearer. If there is no way to specify such a "match all" packet filter, then the PCEF or BBERF may be informed whether the packet filter is for information only or to be installed. That is, the above-described indication received from the PCRF 30 received would have to have an additional value e.g. "for information to UE only".

In embodiments, in which the packet filters are signaled to the UE 10 in such a way that they are not installed in the UE 10, the UE 10 gets packet filter information to associate the bearer procedure with a certain application, but would not install the provided packet filters on the bearer TFT or create a new TFT.

Further, it is to be noted that embodiments, in which the packet filters are signaled to the UE 10 in such a way that they are not installed in the UE 10, can be implemented in the PCEF or BBERF without any support from the PCRF 30. For example, before adding one or more packet filters on a TFT, the PCEF or BBERF could check whether the UE supports the TFT operation which doesn't install the packet filters, and whether the TFT already includes one or more packet filters which would include the packet filter(s) to be added or whether there is a "match all" packet filter among the packet filters in the PCC rule or CloS rule. If this is the case, the packet filter(s) may be signaled to the UE 10 using the TFT operation which doesn't install the packet filters.

Figure 4:
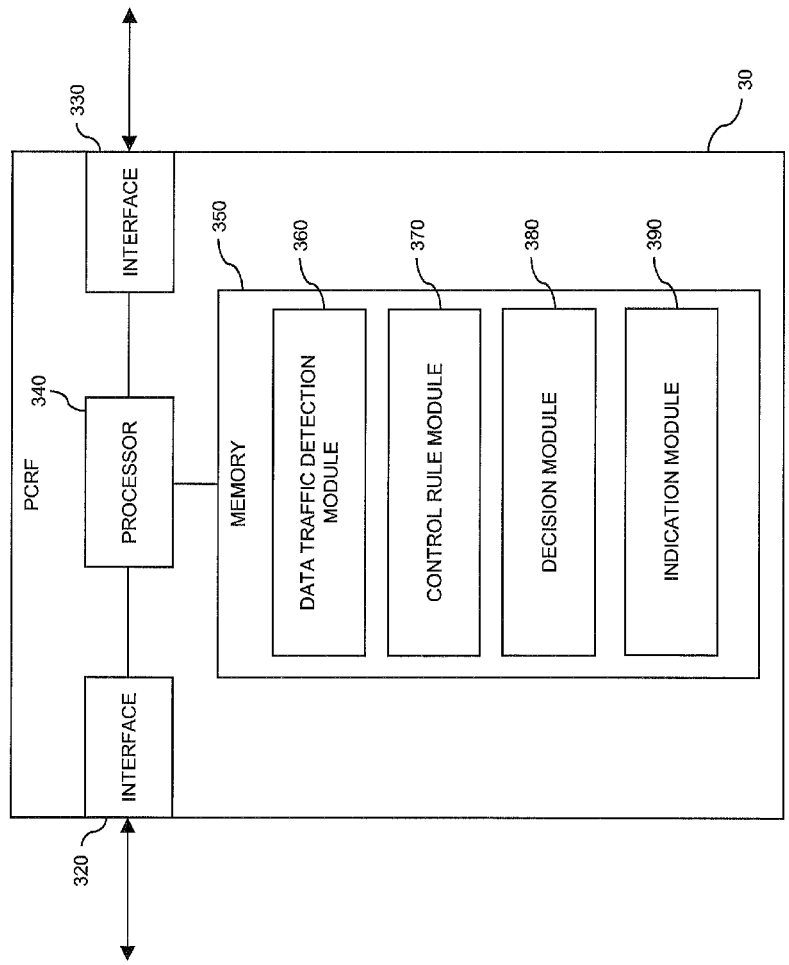
FIG. 4 schematically illustrates a policy controller according to an embodiment of the invention.

FIG. 4 further illustrates an exemplary implementation of the policy controller 30. As explained above, the policy controller is configured to be operated as a PCRF according to the 3GPP Technical Specifications.

In the illustrated implementation, the policy controller 30 includes a first receive/transmit (RX/TX) interface 320 to one or more AFs. The first RX/TX interface 320 may be implemented as a Rx interface according to the 3GPP Technical Specifications. It is to be understood, that the RX/TX interface 320 includes corresponding receivers and transmitters for implementing the receive/transmit functionalities. In addition, the policy controller has a second RX/TX interface 330 to a signaling controller, i.e. to a PCEF or to a BBERF. If the RX/TX interface 330 is to the PCEF, it may be implemented as a Gx interface according to the 3GPP Technical Specifications. If the RX/TX interface is to the BBERF, it may be implemented as a Gxx interface according to the 3GPP Technical Specifications. In some embodiments, the policy controller 30 may be provided with both types of interfaces, i.e. the interface to the PCEF and the interface to the BBERF.

Further, the policy controller 30 includes a processor 340 coupled to the RX/TX interfaces 112, 114 and a memory 350 coupled to the processor 340. The processor may correspond to the processor 33 of FIG. 2. The memory 350 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 350 includes suitably configured program code to be executed by the processor 340 so as to implement the functionalities of policy controller 30 as explained above. More specifically, the memory 350 may include an detection module 360 so as to implement functionalities for detecting data traffic, e.g. indicated via the Rx interface, a control rule module 370 so as to implement functionalities for determining a control rule for the indicated data traffic, a decision module 380 so as to implement functionalities for performing a decision whether installation of a new packet filter in the UE is required, and an indication module 390 so as to implement the functionalities of indicating the result of the decision, e.g. to a signaling controller in a gateway.

It is to be understood that the structure as illustrated in FIG. 4 is merely schematic and that the policy controller 30 may actually include further components which, for the sake of clarity, have not been illustrated, e.g. further interfaces. Also, it is to be understood that the memory 350 may include further types of program code modules, which have not been illustrated, e.g. program code modules for implementing known functionalities of a PCRF according to the 3GPP Technical Specifications.

Figure 5:
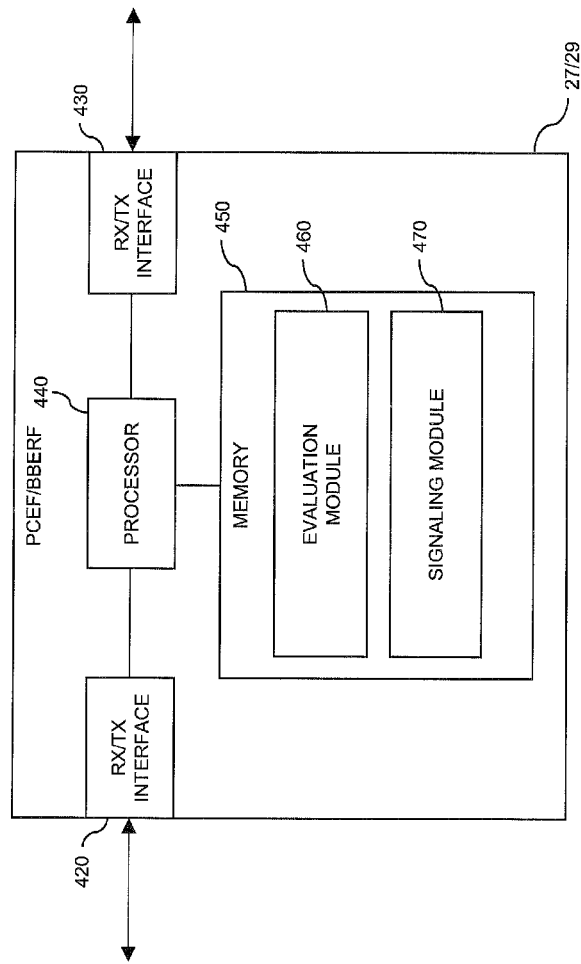
FIG. 5 schematically illustrates a signaling controller according to an embodiment of the invention.

FIG. 5 further illustrates an exemplary implementation of the signaling controller 27/29. As explained above, the signaling controller 27/29 may be configured to be operated as an PCEF according to the 3GPP Technical Specifications, corresponding to reference numeral 27 of FIG. 1, or as a BBERF according to the 3GPP Technical Specifications, corresponding to reference numeral 29 of FIG. 1.

The signaling controller 27/29 includes a first RX/TX interface 420, which has the purpose of coupling the signaling controller 27/29 to the PCRF 30, and a second RX/TX interface 430, which has the purpose of coupling the signaling controller 27/29 to the UE 10, which may be accomplished via intermediate nodes, if the signaling controller 27/29 is implemented as a PCEF, the first RX/TX interface 420 may be implemented as a Gx interface according to the 3GPP Technical Specifications. If the signaling controller 27/29 is implemented as a BBERF, the first RX/TX interface 420 may be implemented as a Gxx interface according to the 3GPP Technical Specifications. The second RX/TX interface 430 may be implemented as a Iu interface according to the 3GPP Technical Specifications. Further, the signaling controller 27/29 includes a processor 440 coupled to the interfaces 420, 430, and a memory 450 coupled to the processor 440. The processor may correspond to the processor 28 as illustrated in FIG. 2. The memory 450 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 450 includes data and suitably configured program code to be executed by the processor 440 so as to implement the functionalities of the signaling controller 27/29 as explained above. More specifically, the memory 450 may include an evaluation module 460 so as to implement evaluation of a result of a decision if installation of a new filter is required, and a signaling module 470 so as to initiate signaling of the new filter to the UE in accordance with the evaluation. The memory 450 may correspond to the memory 25 as illustrated in FIG. 2.

It is to be understood that the structure as illustrated in FIG. 5 is merely schematic and that the signaling controller 27/29 may actually include further components which, for the sake of clarity, have not been illustrated. Also, it is to be understood that the memory 450 may include further types of program code modules, which have not been illustrated, e.g. program code modules for implementing known functionalities of a PCEF or BBERF according to the 3GPP Technical Specifications.

Figure 6:
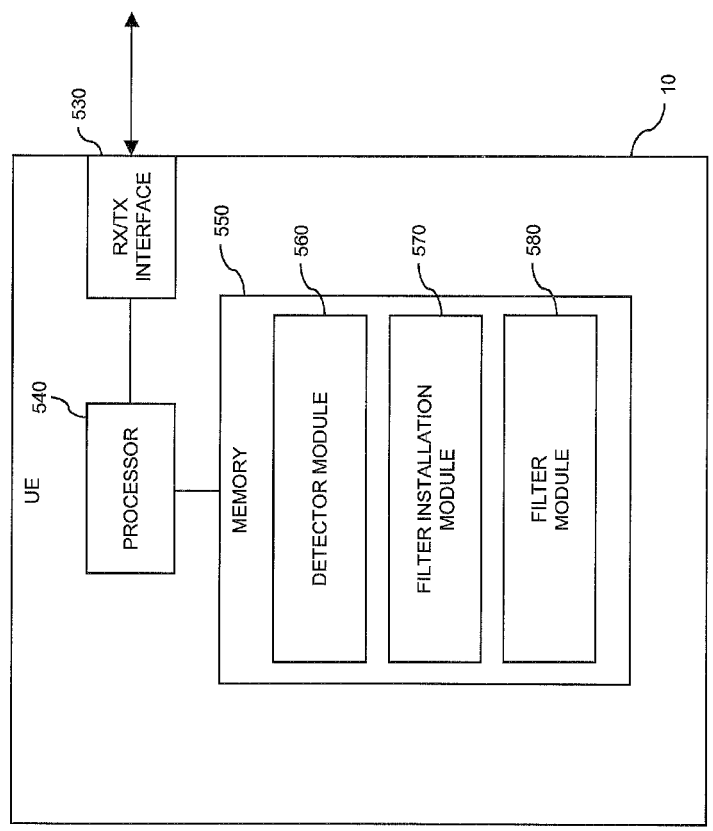
FIG. 6 schematically illustrates a user equipment according to an embodiment of the invention.

FIG. 6 further illustrates an exemplary implementation of the UE 10. As explained above, the UE 10 may be configured to be operated in a mobile communication network according to the 3GPP Technical Specifications.

The UE 10 includes an RX/TX interface 530, which has the purpose of coupling the UE 10 to the RAN 22. The RX/TX interface 530 may be implemented as a radio interface, in particular a Uu interface according to the 3GPP Technical Specifications. Further, the UE 10 includes a processor 540 coupled to the interface 530 and a memory 550 coupled to the processor 540. The processor 540 may correspond to the processor 18 of FIG. 2. The memory 550 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 550 includes suitably configured program code to be executed by the processor 540 so as to implement the functionalities of the UE 10 as explained above. More specifically, the memory 550 may include a detector module 560 so as to determine if a signaled new packet filter is to be installed in the UE 10. Further, the memory 550 may include a filter installation module to control installation of a signaled new filter in accordance with the determination, and a filter module so as to implement the installed packet filters.

It is to be understood that the structure as illustrated in FIG. 6 is merely schematic and that the UE 10 may actually include further components which, for the sake of clarity, have not been illustrated. Also, it is to be understood that the memory 550 may include further types of program code modules, which have not been illustrated, e.g. program code modules for implementing applications running on the UE.

Figure 7:
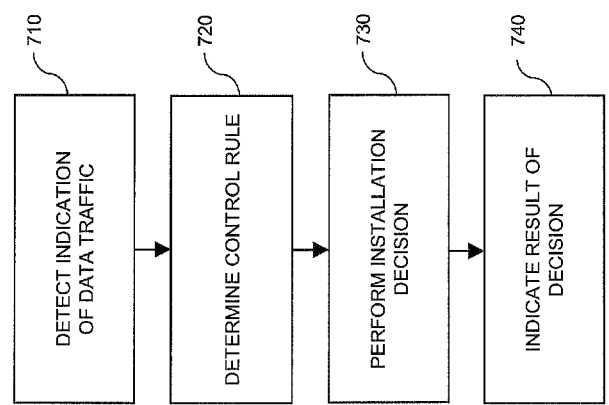
FIG. 7 shows a flowchart for illustrating a method according to an embodiment of the invention.

FIG. 7 shows a flowchart illustrating a method according to an embodiment of the invention. The method may be used in a communication system with a UE and a gateway, e.g. the UE 10 and the gateway 26 as illustrated in FIG. 2, which is configured to send data packets on one or more bearers from the UE to the gateway, and in which one or more packet filters are installed in the UE for associating the data packets with the bearer or bearers. The method may be performed in a policy controller, e.g. in the poli controller 30 implementing functionalities of a PCRF.

At step 710, an indication of data traffic is received, e.g. via an Rx interface of the PCRF. The indicated data traffic may be without an associated control rule, e.g. data traffic of a newly activated application or service running on the UE. The indicated data traffic may also already have an associated control rule, which is to be modified.

At step 720, a new control rule for the indicated data traffic is determined, which may also involve modifying an existing control rule. This may be accomplished on the basis of subscription data and policy data, e.g. as stored in the databases 38, 39 of FIG. 2. Further, this may also involve generating one or more packet filters to be signaled to the UE and determining QoS parameters.

At step 730, a decision is performed if installation of a new packet filter in the UE is required to map the data packets of the indicated data traffic to a particular bearer. The result of the decision may then be indicated to the gateway at step 740. This indication may be accomplished by setting a flag in a message to the gateway or by sending the new packet filter to the gateway together with an indication if the new packet filter is to be signaled to the UE.

Figure 8:
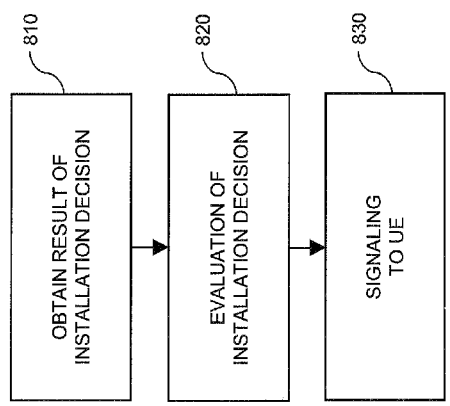
FIG. 8 shows a flowchart for illustrating a further method according to an embodiment of the invention.

FIG. 8 shows a flowchart illustrating a method according to an embodiment of the invention. The method may be used in a communication system with a UE and a gateway, e.g. the UE 10 and the gateway 26 as illustrated in FIG. 2, which is configured to send data packets on one or more bearers from the UE to the gateway, and in which one or more packet filters are installed in the UE for associating the data packets with the bearer or bearers. The method may be performed in a signaling controller, e.g. in a signaling controller implementing functionalities of a PCEF or of a BBERF.

At step 810, a result of a decision is obtained. The result of the decision indicates if installation of a new packet filter in the UE is required to map the data packets of indicated data traffic to a particular bearer. The result may be received from a policy controller, e.g a PCRF, via a corresponding interface, e.g. a Gx interface or a Gxx interface. In some embodiments, the result may also be obtained by making an evaluation in the signaling controller, e.g. on the basis of control rules received from a policy controller.

At step 820, signaling of the new packet filter to the UE is initiated in accordance with the result of the decision. For example, if the result of the decision indicates that installation of the filter is required, the new packet filter is signaled to the UE. If the result of the decision indicates that installation of the new packet filter is not required, the new packet filter is not signaled to the UE. Rather, other signaling with respect to the UE may be accomplished. In some embodiments, if the result of the decision indicates that installation of the new packet filter is not required, the new packet filter may be signaled to the UE in such a way that the UE doesn't install the new packet filter, e.g. by using a specific signaling operation which indicates to the UE that the filter is not to be installed, but for information only.

Figure 9:
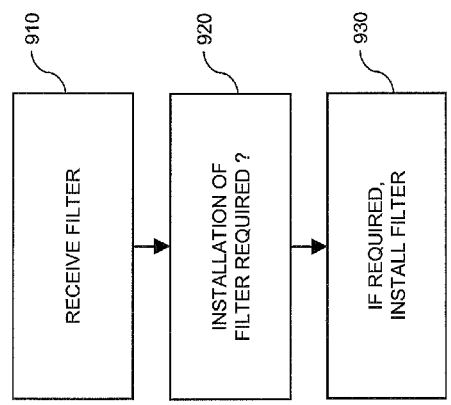
FIG. 9 shows a flowchart for illustrating a further method according to an embodiment of the invention.

FIG. 9 shows a flowchart illustrating a method according to an embodiment of the invention. The method may be used in a communication system with a UE and a gateway, e.g. the UE 10 and the gateway 26 as illustrated in FIG. 2, which is configured to send data packets on one or more bearers from the UE to the gateway, and in which one or more packet filters are installed in the UE for associating the data packets with the bearer or bearers. The method is performed in the UE.

At step 910, a new packet filter is received in the UE. The new packet filter may be received from a signaling controller, e.g. a PCEF or a BBERF, using a specific signaling operation. This may be accomplished via a corresponding receiver or interface of the UE, e.g. the receiver 14 in FIG. 2 or the interface 530 in FIG. 6.

At step 920, the UE determines, from signaling used to transmit the new packet filter, whether installation of the new packet filter in the user equipment is required to map the data packets of indicated data traffic to a specific bearer. This may be accomplished by the detector 19 of FIG. 2 and the detector module of FIG. 6.

At step 930, the new packet filter is installed in accordance with the determination. This may be accomplished by the processor 18 of FIG. 2 or the filter installation module of FIG. 6. For example, if installation of the new packet filter is determined to be required, e.g. if the new packet filter is signaled using a usual signaling operation, the new packet filter is installed. If installation of the new packet filter is determined to be not required, e.g. if the new packet filter is signaled using a specific signaling operation which indicates that the new packet filter is not to be installed, the new packet filter is not installed in the UE. However, the control rule information from the new packet filter is made available to the UE, and may be used to associate a bearer with a certain application running on the UE.

The methods as described in connection with FIGS. 7 to 9 may be combined with each other. In particular, the method of claim 7 may be used to provide the result of the installation decision as input to the method of claim 8, and/or the method of claim 9 may be performed with respect to a received packet filter provided by the method of claim 8.

According to the concepts as described above, by controlling the installation of packet filters in the UE in an efficient manner, the number of installed packet filters in the UE can be limited. Further, in some embodiments also the signaling load between the gateway and the UE may be limited. At the same time the UE may be updated with packet filters or packet filter information for associating a bearer resource with application usage. Further, some embodiments as described above allow media to be mapped to the default bearer. The concepts may be implemented, e.g., in a Converged Packet GW or a Mobile Packet GW which implements the PCEF or in a Service Aware Policy Controller implementing the PCRF. In some embodiments, the concepts may also be implemented in a signaling gateway implementing the BBERF.

It is to be understood that the examples and embodiments as explained above are merely illustrative and susceptible to various modifications. For example, the concepts could be used in other types of communication network. Various types of packet filters may be use in addition or as an alternative to IP 5 tuple filters. Also, different types of messages or signals may be used to convey information between different involved nodes or devices. Existing messages or signals may be modified or new messages or signals may be introduced for this purpose. Further, it is to be understood that the above concepts may be implemented by using correspondingly designed software in existing network devices, or by using dedicated network device hardware. The above-mentioned technical specifications, reports, or standards are incorporated herein by reference.

The invention claimed is:

1. A method in a communication system comprising a policy controller, a user equipment and a gateway, the communication system being configured to send data packets on at least one bearer from the user equipment to the gateway and the user equipment being configured to install at least one packet filter for associating the data packets with the at least one bearer, the method comprising:
   detecting, by the policy controller, an indication of data traffic;
   determining, by the policy controller, a control rule for the indicated data traffic; and
   performing, by the policy controller, a decision if installation of a new packet filter in the user equipment is required to map the data packets of the indicated data traffic to the at least one bearer.

2. The method according to claim 1, wherein the indicated data traffic is data traffic without an associated control rule or data traffic with an associated control rule which is to be modified.

3. The method according to claim 1, comprising setting, by the policy controller, a flag in a message to the gateway, the flag indicating the result of the decision.

4. The method according to claim 3, comprising sending, by the policy controller, an indication to the gateway indicating if the new packet filter is to be signalled to the user equipment.

5. The method according to claim 1, comprising:
   receiving, by the policy controller from the gateway, an indication that the gateway does not support detecting if the new packet filter is to be signalled to the user equipment; and
   activating, by the policy controller, the determined control rule in the gateway without indicating result of the decision to the gateway.

6. The method according to claim 1, comprising:
   generating, by the policy controller, the new packet filter; and
   sending, by the policy controller, the new packet filter to the gateway.

7. A method in a communication system with a policy controller, a signalling controller, a user equipment and a gateway, the communication system being configured to send data packets on at least one bearer from the user equipment to the gateway and the user equipment being configured to install at least one packet filter for associating the data packets with the at least one bearer, the method comprising:
   obtaining, by the signalling controller, a result of a decision if installation of a new packet filter is required in the user equipment to map indicated data traffic to the at least one bearer, where the signalling controller obtains the result from the policy controller;
   evaluation, by the signalling controller, of the result; and
   initiating, by the signalling controller, in accordance with the evaluation, signalling of the new packet filter to the user equipment.

8. The method according to claim 7, comprising signalling, by the signalling controller, the new packet filter to the user equipment, said signalling indicating if installation of the new packet filter is required according to the decision.

9. The method according to claim 7, comprising if the installation of the new packet filter is not required, performing, by the signalling controller, no signalling of the new packet filter to the user equipment.

10. A method in a communication system with a user equipment and a gateway, the communication system being configured to send data packets on at least one bearer from the user equipment to the gateway and the user equipment being configured to install at least one packet filter for associating the data packets with the at least one bearer, the method comprising:
    receiving, by the user equipment, a new packet filter;
    determining, by the user equipment, from signalling used to transmit the new filter if installation of the new packet filter in the user equipment is required to map the data packets of indicated data traffic to the at least one bearer; and
    installing, by the user equipment, the new packet filter in accordance with the determination.

11. A policy controller in a communication system with a user equipment and a gateway, the communication system being configured to send data packets on at least one bearer from the user equipment to the gateway and the user equipment being configured to install at least one packet filter for associating the data packets with the at least one bearer, the policy controller comprising:
    a receiver configured to receive an indication of data traffic; and
    a processor for determining a control rule for the indicated data traffic, the processor being configured to perform a decision if installation of a new packet filter is required to map the data packets of the indicated data traffic to the at least one bearer, wherein the receiver and the processor are components of the policy controller.

12. The policy controller according to claim 11, comprising a transmitter for transmitting the result of the decision to the gateway wherein the transmitter is a component of the policy controller.

13. The policy controller according to claim 12, wherein the transmitter is configured to set a flag in a message to the gateway, the flag indicating the result of the decision.

14. A signalling controller in a communication system with a policy controller, a user equipment and a gateway, the communication system being configured to send data packets on at least one bearer from the user equipment to the gateway and the user equipment being configured to install at least one packet filter for associating the data packets with the at least one bearer, the signalling controller comprising:
    a first interface for receiving a result of a decision if installation of a new packet filter is required in the user equipment to map data traffic to the at least one bearer where the first interface receives the result from the policy controller; and
    a processor configured for evaluation of the result and initiating signalling of the new packet filter to the user equipment in accordance with the evaluation, wherein the first interface and the processor are components of the signalling controller.

15. The signalling controller according to claim 14, comprising a second interface configured to transmit, to the user equipment, the new filter or an indication if the new packet filter is to be installed in the user equipment, wherein the second interface is a component of the signalling controller.

16. The signalling controller according to claim 14, wherein the signalling controller is in the gateway.

17. The signalling controller according to claim 14, wherein the result is received from the policy controller and the first interface is configured to send information to the policy controller, said information indicating that the signalling controller is capable of said evaluation and initiating of signalling in response to the evaluation.

18. A user equipment, comprising:
a transmitter configured to send data packets on at least one bearer to a gateway;
a processor configured to install at least one packet filter for associating the data packets with the at least one bearer;
a receiver configured to receive a new packet filter; and
a detector configured to determine, from signalling used to transmit the new packet filter, if installation of the new packet filter is required to map data packets of indicated data traffic to the at least one bearer,
wherein the processor is configured to install the new packet filter in accordance with the determination by the detector, and wherein the transmitter, the processor, the receiver, and the detector are components of the user equipment.

19. The method according to claim 3, wherein the setting of the flag by the policy controller is dependent on whether precondition signalling is required by the user equipment.

20. The policy controller according to claim 13, wherein the setting of the flag is dependent on whether precondition signalling is required by the user equipment.

21. The method according to claim 1, wherein the policy controller is a Policy and Charging Rules Function.

22. The policy controller according to claim 11, wherein the policy controller is a Policy and Charging Rules Function.

23. The method according to claim 7, wherein the signalling controller is a Policy and Charging Enforcement Function or a Bearer Binding and Event Reporting Function.

24. The signalling controller according to claim 14, wherein the signalling controller is a Policy and Charging Enforcement Function or a Bearer Binding and Event Reporting Function.

* * * * *